US012711208B2

(12) United States Patent
Gay et al.

(10) Patent No.: US 12,711,208 B2
(45) Date of Patent: Aug. 18, 2026

(54) SYSTEM AND METHOD FOR USER DEVICE RECOVERY THROUGH ALTERNATIVE USER AUTHENTICATION PROCESSES

(71) Applicant: BANK OF AMERICA CORPORATION, Charlotte, NC (US)

(72) Inventors: Gerard P. Gay, Seattle, WA (US); Malinda Kieffer, Chillicothe, MO (US); Tanya A. Wilson, Newark, DE (US); Susan J. Moss, Vestal, NY (US); Andrzej Grabski, Glen Rock, NJ (US); Kiran Boosetty, Jacksonville, FL (US); Donna Lee Phillips, Elkton, MD (US); Robert Ronald Rosseland, Jr., Huntersville, NC (US); Ravinder Kaur Sodhi, Royse City, TX (US); Rahul Kumar Mishra, Skillman, NJ (US); Samuel M. Moiyallah, Jr., Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 62 days.

(21) Appl. No.: 18/619,973

(22) Filed: Mar. 28, 2024

(65) Prior Publication Data

US 2025/0307359 A1 Oct. 2, 2025

(51) Int. Cl.
*G06F 21/31* (2013.01)

(52) U.S. Cl.
CPC .................................... *G06F 21/31* (2013.01)

(58) Field of Classification Search
CPC ................................. G06F 21/31; G06F 21/32
See application file for complete search history.

(56) References Cited

U.S. PATENT DOCUMENTS 9,264,419 B1 * 2/2016 Johansson ............... G06F 21/45
9,419,951 B1 8/2016 Felsher
(Continued)

OTHER PUBLICATIONS

Q. Wang and D. Wang, "Understanding Failures in Security Proofs of Multi-Factor Authentication for Mobile Devices, " in IEEE Transactions on Information Forensics and Security, vol. 18, pp. 597-612, 2023. (Year: 2023).*
(Continued)

*Primary Examiner* — Kari L Schmidt
(74) *Attorney, Agent, or Firm* — Moore & Van Allen PLLC; Nicholas C. Russell

(57) ABSTRACT

A system is provided for user device recovery through alternative user authentication processes. In particular, the system may provide to the user one or more alternative user authentication methods in the event that a primary user authentication method associated with a first user device is unsuccessful, where the first user device may become unavailable as a result. In such a scenario, the one or more alternative user authentication methods may include an authentication process involving a second user device. The system may assess the capabilities of the second user device in authenticating the user, and subsequently initiate a secondary authentication process using the second user device. Based on successfully completing the secondary authentication process, the system may allow the user to recover the first user device in the event that the first user device is unavailable.

14 Claims, 5 Drawing Sheets

(56) References Cited

U.S. PATENT DOCUMENTS

| | | | | |
|---|---|---|---|---|
| 9,432,361 | B2 | 8/2016 | Mahaffey | |
| 9,521,123 | B2 | 12/2016 | Jueneman | |
| 9,589,148 | B2 | 3/2017 | Hare | |
| 9,762,553 | B2 | 9/2017 | Ford | |
| 9,854,063 | B2 | 12/2017 | Borzycki | |
| 10,108,807 | B2 | 10/2018 | Hare | |
| 10,181,041 | B2 | 1/2019 | Bhansali | |
| 10,476,873 | B2 | 11/2019 | Turgeman | |
| 10,586,036 | B2 | 3/2020 | Turgeman | |
| 10,904,008 | B2 | 1/2021 | Tomlinson | |
| 11,050,736 | B2 | 6/2021 | Mahaffey | |
| 11,082,221 | B2 | 8/2021 | Ebrahimi | |
| 11,126,635 | B2 | 9/2021 | Behzadi | |
| 11,824,991 | B2 | 11/2023 | Fiske | |
| 11,874,911 | B2 | 1/2024 | Chung | |
| 11,973,747 | B2 * | 4/2024 | Bloom | H04W 12/63 |
| 12,014,369 | B2 | 6/2024 | Giobbi | |
| 2016/0344730 | A1 * | 11/2016 | Holz | H04L 63/0428 |
| 2017/0034155 | A1 * | 2/2017 | Khalil | H04L 63/102 |
| 2017/0085546 | A1 * | 3/2017 | Velusamy | H04W 12/35 |
| 2017/0126640 | A1 * | 5/2017 | Vincent | H04L 63/083 |
| 2017/0346815 | A1 * | 11/2017 | Andrews | H04L 63/0853 |
| 2018/0367506 | A1 | 12/2018 | Ford | |
| 2020/0274720 | A1 | 8/2020 | Melo | |
| 2020/0404019 | A1 | 12/2020 | Drake | |
| 2021/0004454 | A1 | 1/2021 | Chester | |
| 2021/0028927 | A1 * | 1/2021 | Khaleghi | H04L 9/3213 |
| 2021/0058395 | A1 * | 2/2021 | Jakobsson | H04L 67/306 |
| 2021/0158315 | A1 * | 5/2021 | Phillips | G06Q 20/1085 |
| 2022/0131696 | A1 | 4/2022 | O'Hare | |
| 2022/0277070 | A1 * | 9/2022 | Robert Jose | G06F 21/45 |
| 2022/0329581 | A1 * | 10/2022 | Zaki | G06F 9/451 |

OTHER PUBLICATIONS

B. Rodrigues, A. Chaudhari and S. More, "Two factor verification using QR-code: A unique authentication system for Android smartphone users," 2016 2nd International Conference on Contemporary Computing and Informatics (IC3I), Greater Noida, India, 2016, pp. 457-462. (Year: 2016).*

V. Papaspirou, L. Maglaras, M. A. Ferrag, I. Kantzavelou, H. Janicke and C. Douligeris, "A novel Two-Factor HoneyToken Authentication Mechanism," 2021 International Conference on Computer Communications and Networks (ICCCN), Athens, Greece, 2021, pp. 1-7. (Year: 2021).*

* cited by examiner

SYSTEM AND METHOD FOR USER DEVICE RECOVERY THROUGH ALTERNATIVE USER AUTHENTICATION PROCESSES

TECHNOLOGICAL FIELD

Example embodiments of the present disclosure relate to a system for user device recovery through alternative user authentication processes.

BACKGROUND

There is a need for a secure, reliable way to perform user device recovery.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for user device recovery through alternative user authentication processes. In particular, the system may provide to the user one or more alternative user authentication methods in the event that a primary user authentication method associated with a first user device is unsuccessful, where the first user device may become unavailable as a result. In such a scenario, the one or more alternative user authentication methods may include an authentication process involving a second user device. The system may assess the capabilities of the second user device in authenticating the user, and subsequently initiate a secondary authentication process using the second user device. Based on successfully completing the secondary authentication process, the system may allow the user to recover the first user device in the event that the first user device is unavailable.

Accordingly, embodiments of the present disclosure provide a system for user device recovery through alternative user authentication processes, the system comprising a processing device; a non-transitory storage device containing instructions when executed by the processing device, causes the processing device to perform the steps of: receiving a request to execute an intended user action using a first user device associated with a user; detecting a failed user authentication attempt associated with the first user device; presenting one or more alternative authentication options to the user on a display device; detecting that an alternative authentication process based on the one or more alternative authentication options has succeeded; and presenting one or more remediation options to the user on a display device.

In some embodiments, detecting the failed user authentication attempt associated with the first user device comprises detecting a threshold number of failed authentication attempts; and based on detecting the threshold number of failed authentication attempts, locking the first user device.

In some embodiments, the one or more alternative authentication options comprises initiating the alternative authentication process using a second user device.

In some embodiments, the second user device is a mobile computing device of the user, wherein the alternative authentication process further comprises establishing a wireless connection to the second user device; transmitting an authentication query to the second user device; and receiving a response to the authentication query from the second user device.

In some embodiments, the authentication query comprises a request to access a user application installed on the second user device.

In some embodiments, the second user device is an object comprising a scannable code, wherein the scannable code comprises at least one of a QR code or a barcode, wherein the alternative authentication process further comprises scanning the scannable code on the second user device; and extracting a set of user authentication credentials from the scannable code.

In some embodiments, the one or more remediation options comprises returning control of the first user device to the user; and automatically executing the intended user action based on detecting that the alternative authentication process has succeeded.

Embodiments of the present disclosure also provide a computer program product for user device recovery through alternative user authentication processes, the computer program product comprising a non-transitory computer-readable medium comprising code causing an apparatus to perform the steps of receiving a request to execute an intended user action using a first user device associated with a user; detecting a failed user authentication attempt associated with the first user device; presenting one or more alternative authentication options to the user on a display device; detecting that an alternative authentication process based on the one or more alternative authentication options has succeeded; and presenting one or more remediation options to the user on a display device.

In some embodiments, detecting the failed user authentication attempt associated with the first user device comprises detecting a threshold number of failed authentication attempts; and based on detecting the threshold number of failed authentication attempts, locking the first user device.

In some embodiments, the one or more alternative authentication options comprises initiating the alternative authentication process using a second user device.

In some embodiments, the second user device is a mobile computing device of the user, wherein the alternative authentication process further comprises establishing a wireless connection to the second user device; transmitting an authentication query to the second user device; and receiving a response to the authentication query from the second user device.

In some embodiments, the authentication query comprises a request to access a user application installed on the second user device.

In some embodiments, the second user device is an object comprising a scannable code, wherein the scannable code comprises at least one of a QR code or a barcode, wherein the alternative authentication process further comprises scanning the scannable code on the second user device; and extracting a set of user authentication credentials from the scannable code.

Embodiments of the present disclosure also provide a computer-implemented method for user device recovery through alternative user authentication processes, the computer-implemented method comprising receiving a request to execute an intended user action using a first user device associated with a user; detecting a failed user authentication attempt associated with the first user device; presenting one or more alternative authentication options to the user on a display device; detecting that an alternative authentication process based on the one or more alternative authentication options has succeeded; and presenting one or more remediation options to the user on a display device.

In some embodiments, detecting the failed user authentication attempt associated with the first user device comprises detecting a threshold number of failed authentication attempts; and based on detecting the threshold number of failed authentication attempts, locking the first user device.

In some embodiments, the one or more alternative authentication options comprises initiating the alternative authentication process using a second user device.

In some embodiments, the second user device is a mobile computing device of the user, wherein the alternative authentication process further comprises establishing a wireless connection to the second user device; transmitting an authentication query to the second user device; and receiving a response to the authentication query from the second user device.

In some embodiments, the authentication query comprises a request to access a user application installed on the second user device.

In some embodiments, the second user device is an object comprising a scannable code, wherein the scannable code comprises at least one of a QR code or a barcode, wherein the alternative authentication process further comprises scanning the scannable code on the second user device; and extracting a set of user authentication credentials from the scannable code.

In some embodiments, the one or more remediation options comprises returning control of the first user device to the user; and automatically executing the intended user action based on detecting that the alternative authentication process has succeeded.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
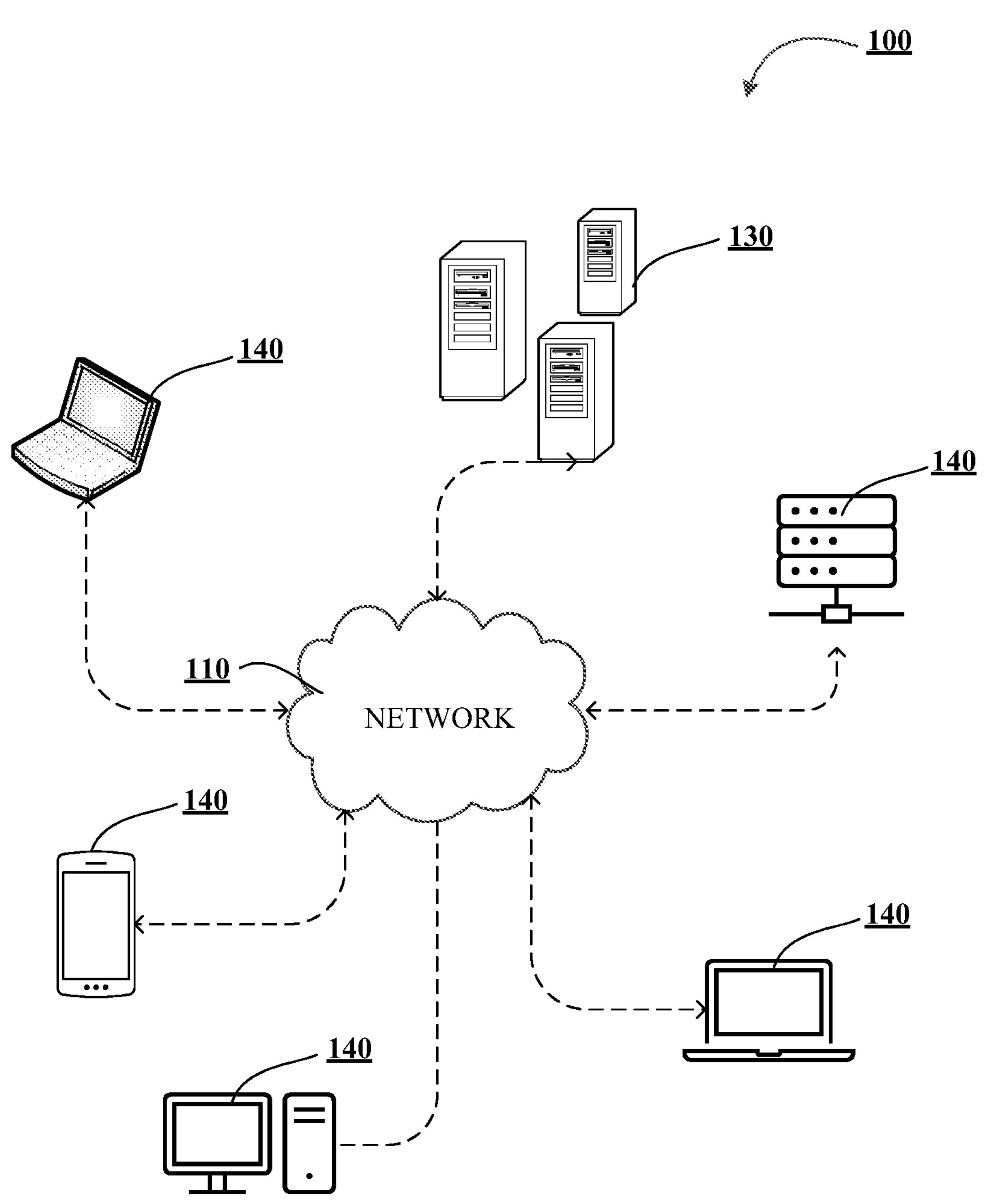
Figure 1B:
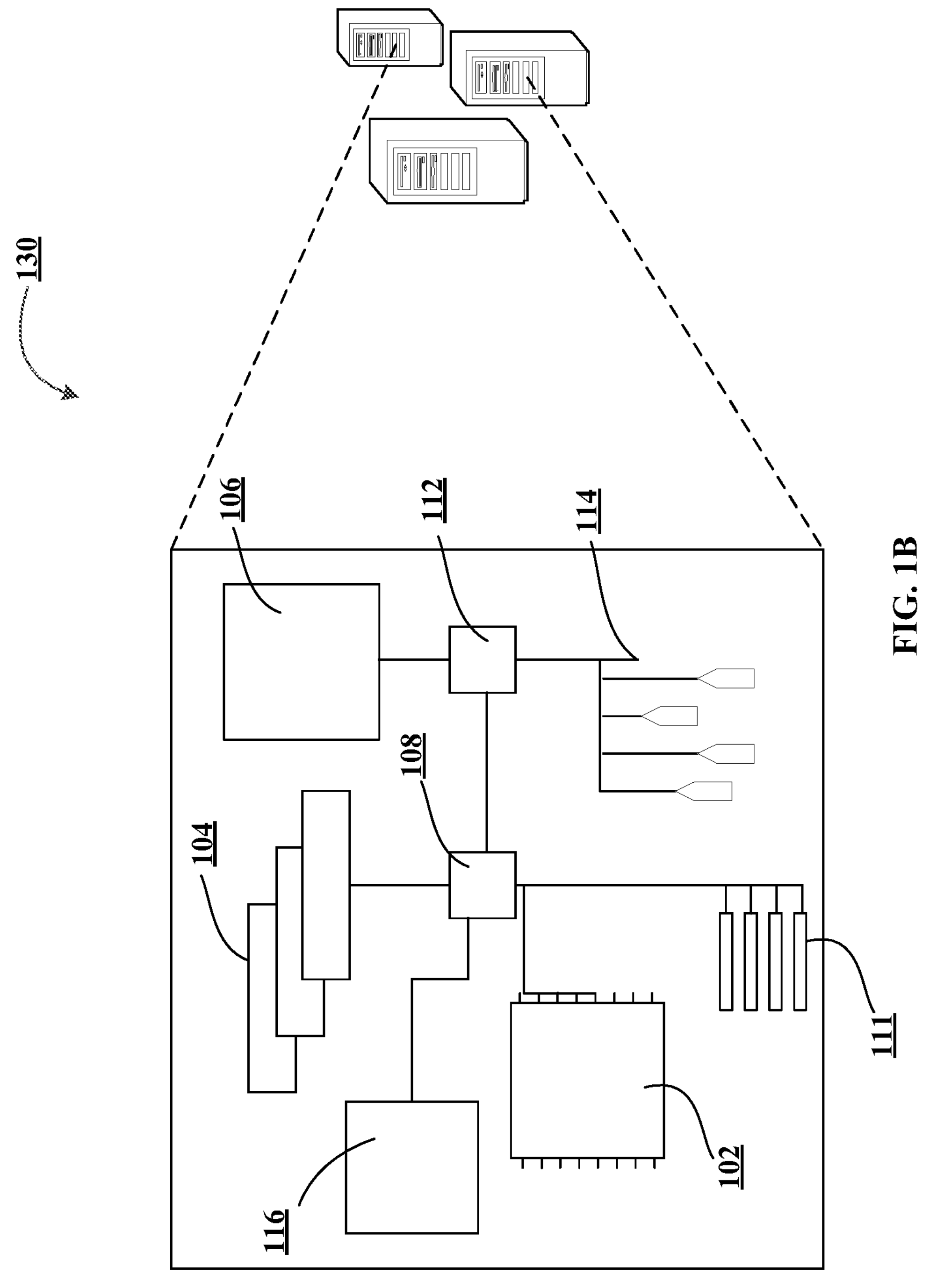
Figure 1C:
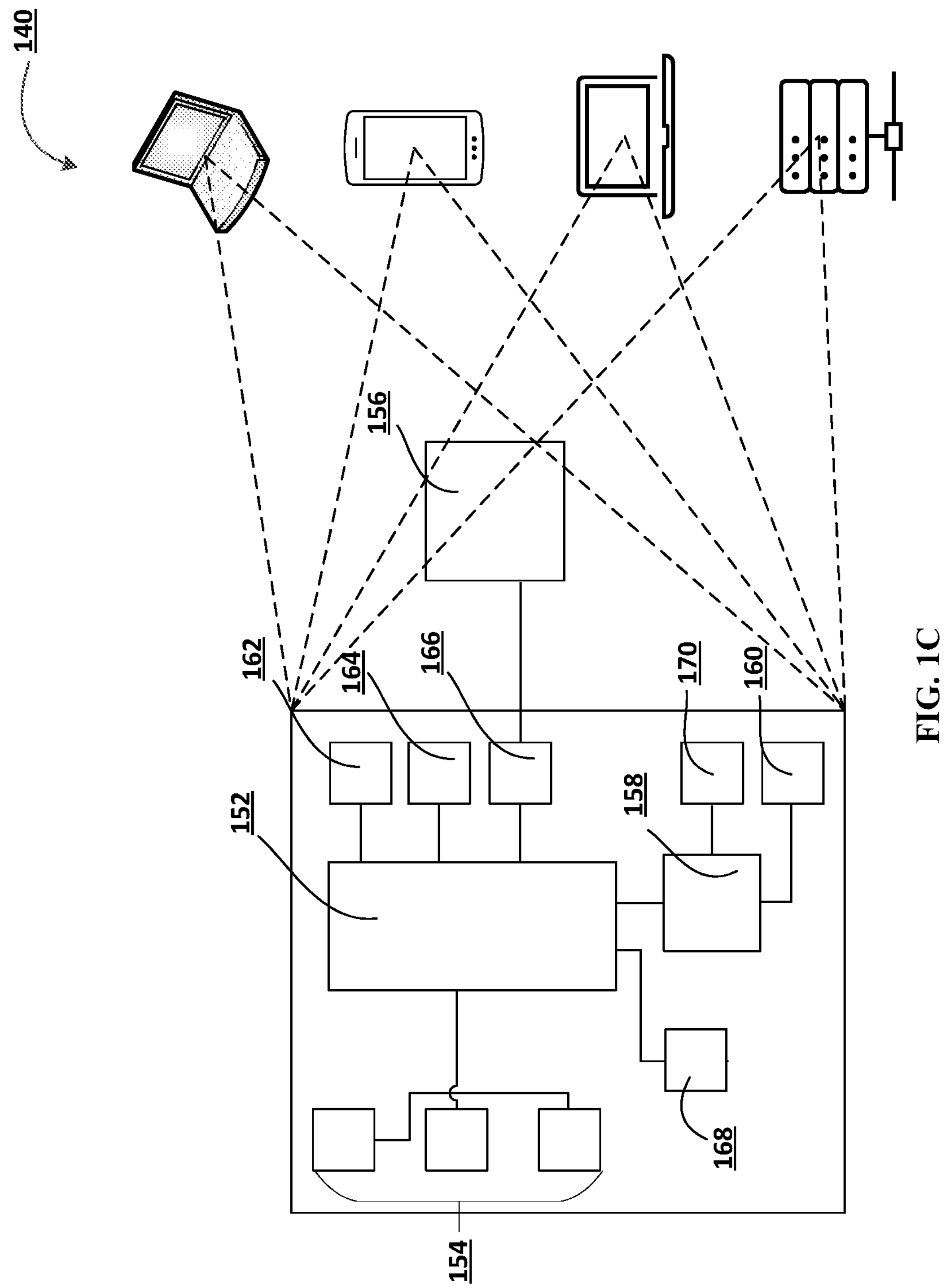
Figure 2:
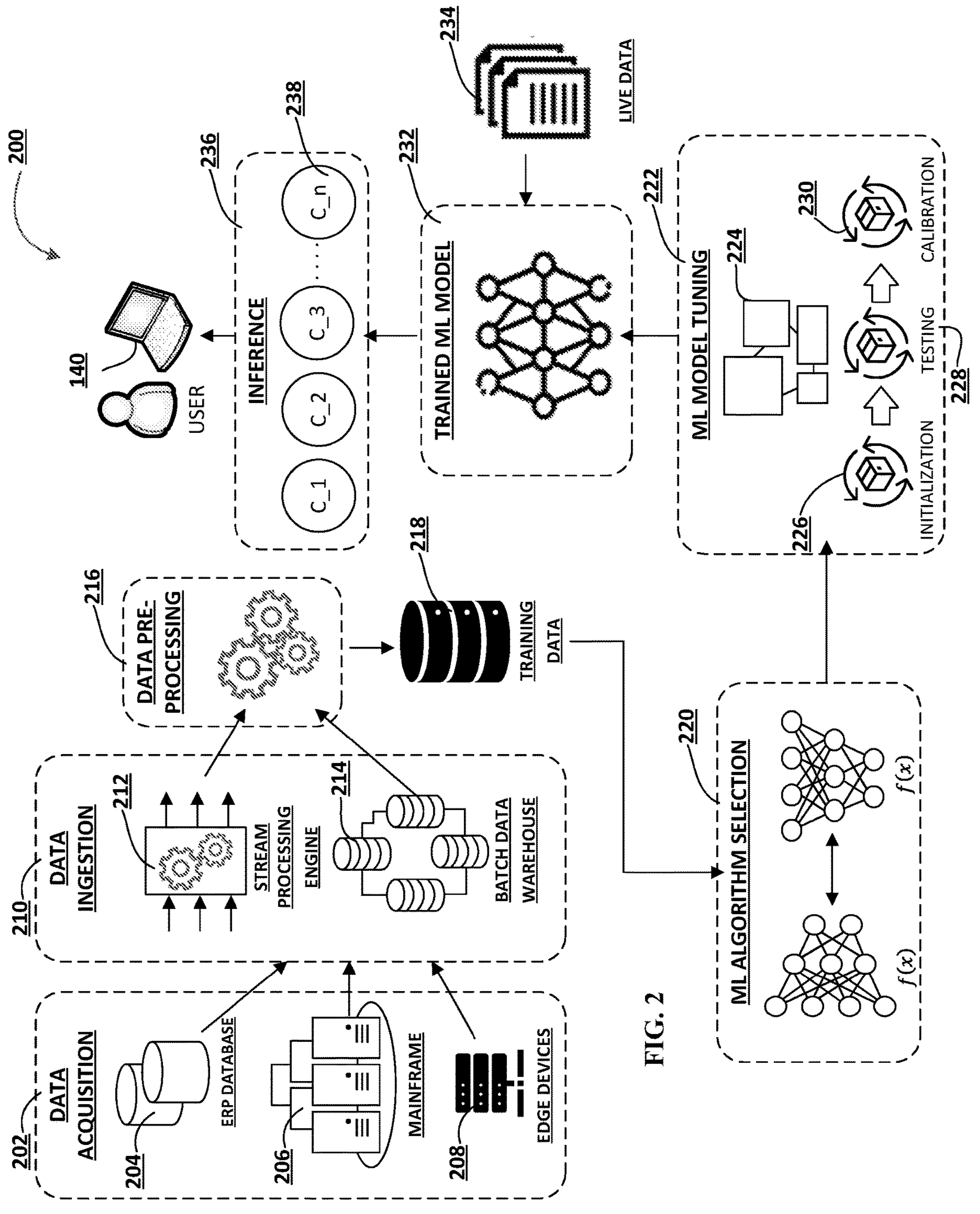
Figure 3:
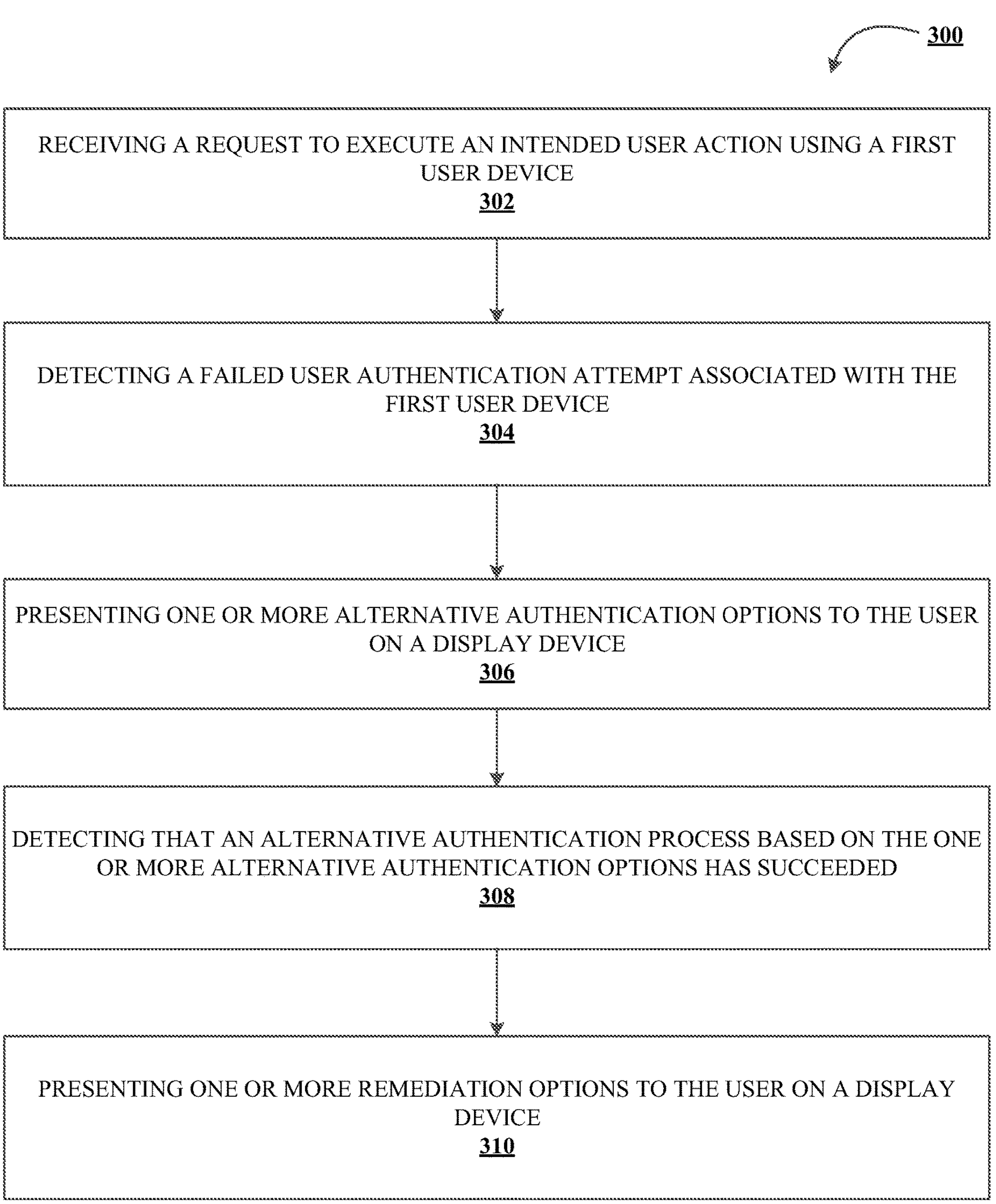

FIGS. 1A-1C illustrates technical components of an exemplary distributed computing system for user device recovery through alternative user authentication processes, in accordance with an embodiment of the disclosure;

FIG. 2 illustrates an exemplary machine learning subsystem architecture, in accordance with an embodiment of the invention;

FIG. 3 illustrates a method for user device recovery through alternative user authentication processes, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like.

"User device" as used herein may include various objects or devices that may be owned and/or operated by the user within the network environment. In this regard, the user device may be an end-point device such as a mobile phone, smart device, IoT device, and/or the like. In other embodiments, the user device may be an object used by the user in executing transactions, such as a debit card, credit card, and/or the like.

User devices may be used with networked end-point devices to perform various functions, where the end-point device may perform an authentication of a user through the user device. In some cases, in the event that the initial authentication fails, the user device may be locked or otherwise become unavailable to the user. In time-sensitive situations, it may be desirable to provide a way for the user to quickly unlock and recover the user device, and/or perform the user's originally desired processes. Accordingly, there is a need for a more efficient, user-friendly way to perform alternative authentication of the user.

To address the above concerns among others, the system described herein provides a way to use alternative authentication processes to authenticate the user to perform certain actions, such as recovery of a user device, transaction processing, and/or the like. In this regard, when the user accesses an endpoint device using a first user device to execute a desired process (e.g., a transaction), the system may use the one or more alternative user authentication processes based on information received from and/or about the user and/or another user device. For instance, in some embodiments, an alternative user authentication process may include detecting an installed application on a second user device of the user (e.g., a smartphone or mobile device). In this regard, the endpoint device may query the second user device directly (e.g., through wireless technologies such as Bluetooth, NFC, Wi-Fi, and/or the like) or indirectly (e.g., through a remote cloud server that may be connected to the second user device over the Internet) regarding the identity of the user. Upon receiving the query, the second user device may prompt the user to provide a set of authentication credentials (e.g., a username and password, PIN, unique identifier data such as a fingerprint scan or facial scan, and/or the like). Upon successfully authenticating the user using the set of authentication credentials, the second user device may transmit a response to the query from the endpoint device, where the response indicates that the user has been authenticated successfully.

Once the endpoint device receives the response from the second user device, the endpoint device may present one or more remediation options to the user with respect to the locked or unavailable first user device. For instance, a remediation option may include unlocking the first user device and making the first user device available to the user once more. Another remediation option may include processing the intended or desired user action based on authenticating the user through the second user device.

An exemplary embodiment is provided as follows. It should be understood that the following example is provided for illustrative purposes only and is not intended to restrict the scope of the disclosure provided herein. In one embodiment, a user may insert a first user device such as a debit card or credit card into an endpoint device such as an automated teller machine for the purpose of executing a user action such as a withdrawal of funds. During the course of performing the desired user action, the user may encounter various obstacles that may prevent the user action from being executed. Such obstacles may include, for instance, the user forgetting the authentication credentials associated with the first user device (and subsequently enter the incorrect credentials into the endpoint device), a defective user interface on the endpoint device (e.g., a keypad with a malfunctioning key), software/hardware bug or failure of the endpoint device, dependency failure associated with the endpoint device, and/or the like. As a result of the obstacle, in some instances, the first user device may become locked or trapped within the endpoint device (e.g., the endpoint device wrongly identifies the user as an unauthorized user and retains the first user device for security purposes).

In such a scenario, the system may take various actions to prevent the locking of the first user device and/or to unlock the first user device and/or perform the user's intended actions. In this regard, in some embodiments, the endpoint device may, upon detecting at least one failed attempt of the user to become authenticated, present a message on a display device of the endpoint device (e.g., a monitor, screen, and/or the like), where the message may indicate that additional authentication attempts may result in the first user device becoming locked. Additionally or alternatively, the system provide one or more alternative authentication options so that the user may recover the first user device and/or the intended user action (e.g., the transaction). Accordingly, in some embodiments, an alternative authentication option may include the use of a second user device (e.g., a secondary debit card, card with a scannable code such as a QR code, bar code, and/or the like) and/or secondary authentication credentials (e.g., a proxy PIN, AI-based recognition of the user's unique identifiers, such as fingerprint scans, facial scans, voice sample data, and/or the like). In some embodiments, the secondary user device may be a smartphone on which an entity application is installed (e.g., a mobile application of an entity associated with the endpoint device).

The message presented to the user may include a list of various alternative authentication options, where the list may include interface elements that allow the user to select the most convenient alternative authentication option from the list (e.g., by a touch screen input, mouse input, keyboard/keypad input, and/or the like). Once the user selects an option, the system may attempt to authenticate the user through the selected alternative authentication method. For instance, if the user selects the "mobile app" option, the endpoint device may attempt to establish a connection with the user's smartphone and query the smartphone to authenticate the user. In cases in which the user selects the secondary authentication credential option, one or more user input devices on the endpoint device may be used to capture live authentication data from the user and subsequently perform the authentication based on the live authentication data. For instance, fingerprint scans of the user may be captured through a fingerprint scanner on the endpoint device, facial image data may be captured by one or more cameras installed on the endpoint device, voice sample data may be captured by an integrated microphone on the endpoint device, and/or the like. In such embodiments, authenticating the user may include analyzing the captured live authentication data using an AI-based algorithm (e.g., a facial recognition model) and comparing the live authentication data to reference authentication data of the user (e.g., stored reference facial images associated with the user).

Once the endpoint device has successfully authenticated the user, the endpoint device may present one or more remediation options to remedy the first failed authentication attempt. For instance, one option that the user may select may be to return the first user device so that the user may attempt the desired user actions at another endpoint device (e.g., another automated teller machine). In such a scenario, the system may automatically cancel the requested user action (e.g., prevent the transaction from being completed). Alternatively or in addition, the options may include executing the desired user action based on successfully authenticating the user through the alternative authentication method. For instance, the endpoint device may allow the user to make the withdrawal based on the alternative authentication method in spite of the failed authentication attempt. In this way, the system provides a flexible and reliable way for users to recover a potentially locked user device and meanwhile execute their intended actions through alternative authentication methods.

The system as described herein provides a number of technological benefits over conventional methods for authorizing intended user actions through user authentication. For instance, by using alternative authentication methods, the system may prevent scenarios in which a user device may be permanently lost or unavailable through multiple failed authentication attempts. Furthermore, by presenting multiple remediation options to the user in response to a successful alternative authentication process, the system may reduce the instances of wrongly rejected user actions, which in turn prevents the waste of computing resources expended in rejecting the user actions.

Turning now to the figures, FIGS. 1A-1C illustrate technical components of an exemplary distributed computing environment 100 for the system for user device recovery through alternative user authentication processes. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method 300 for user device recovery through alternative user authentication processes. As shown in block 302, the method includes receiving a request to execute an intended user action using a first user device. In this regard, the user action may be an action that uses information stored on the first user device in its execution. In an exemplary embodiment, the user action may be an action taken with respect to a user's account with a financial institution (e.g., a transaction such as a deposit, withdrawal, transfer, and/or the like). In such a scenario, the first user device may be a device that stores information related to the user's account (e.g., a credit card, debit card, and/or the like). Accordingly, receiving the request may further include reading the user account information from the first user device.

Next, as shown in block 304, the method includes detecting a failed user authentication attempt associated with the first user device. The failed user authentication attempt may be, for example, a faulty authentication credential provided by the user (e.g., a PIN). In this regard, the first user device may be associated with an authentication credential such as a username and password, PIN, and/or the like, such that the authentication credential must be provided before the first user device is used to execute any intended user actions. Accordingly, in some cases, the system may remove access to the first user device (e.g., by locking the first user device) after receiving a threshold number of failed authentication attempts. In such a scenario, it may be desirable to provide the user with alternative options for completing the authentication process such that the user does not get locked out of the first user device.

Next, as shown in block 306, the method includes presenting one or more alternative authentication options to the user on a display device. Each of the alternative authentication options may be completed by the user in the event that the first authentication attempt fails. For instance, in some embodiments, the one or more alternative authentication options may include secondary authentication using a second user device. In some embodiments, the second user device may be a mobile computing device such as a smartphone. In such a scenario, the system may establish a wireless connection to the second user device (e.g., a local wireless connection through NFC, Wi-Fi, Bluetooth, and/or the like, or a remote wireless connection through a cloud server connected to the second user device) and transmit an authentication query associated with the user to the second user device, where the query includes a request to provide additional authentication credentials. In response, the second user device may prompt the user to provide the additional authentication credentials (e.g., a proxy PIN, unique identifier data, and/or the like). Alternatively, the query may include a request to access a user application installed on the second user device. In other embodiments, the second user device may be an object with a scannable code (e.g., a QR code, barcode, and/or the like). In such a scenario, the alternative authentication option may include scanning the scannable code on the second user device, and extracting authentication credentials associated with the user from the scannable code. In yet other embodiments, the system itself may prompt the user to provide the additional authentication credentials directly (e.g., through a display device of the endpoint device), and subsequently receive the additional authentication credentials (e.g., a proxy PIN, fingerprint scan, facial image, and/or the like) through a user input device (e.g., a keypad, camera, fingerprint scanner, and/or the like).

Next, as shown in block 308, the method includes detecting that an alternative authentication process based on the one or more alternative authentication options has succeeded. Detecting that the alternative authentication process may include, in some embodiments, capturing live authentication data from the user (e.g., the additional authentication credentials) and comparing the live authentication data to reference authentication data associated with the user. Upon detecting a match, the system may determine that the alternative authentication process has succeeded (e.g., the user has provided valid alternative authentication credentials). For instance, in embodiments in which the second user device is a smartphone, detecting that an alternative authentication process may include detecting that the user has provided valid authentication credentials through the second user device.

Next, as shown in block 310, the method includes presenting one or more remediation options to the user on a display device. The one or more remediation options may be displayed based on detecting that the alternative authentication process has succeeded. In this regard, the one or more remediation options may include unlocking or returning control of the first user device to the user and/or canceling execution of the intended user action. In other scenarios, the one or more remediation options may include executing the intended user action based on detecting that the alternative authentication process has succeeded. For example, in embodiments in which the intended user action is a transaction (e.g., a transfer of resources from a first account to a second account), the remediation option may include executing the transaction in spite of the first failed user authentication attempt. In this way, the system provides for flexibility and recovery of locked user devices during user interactions with the entity's networked systems.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for user device recovery through alternative user authentication processes, the system comprising:

a processing device;

a non-transitory storage device containing instructions when executed by the processing device, causes the processing device to perform the steps of:

receiving a request to execute an intended user action using a first user device associated with a user;

detecting a failed user authentication attempt associated with the first user device, wherein the failed user authentication attempt comprises detecting a threshold number of failed authentication attempts and locking the first user device based on detecting the threshold number of failed authentication attempts;

presenting one or more alternative authentication options to the user on a display device;

detecting that an alternative authentication process with a second user device based on the one or more alternative authentication options has succeeded, wherein detecting the alternative authentication process further comprises capturing live authentication data from the user and comparing the live authentication data to reference authentication data associated with the user and first user device, wherein the second user device displays a scannable code with authentication credentials for the first user device; and presenting one or more remediation options to the user on a display device.

2. The system of claim 1, wherein the one or more alternative authentication options comprises initiating the alternative authentication process using the second user device.

3. The system of claim 2, wherein the second user device is a mobile computing device of the user, wherein the alternative authentication process further comprises:

establishing a wireless connection to the second user device;

transmitting an authentication query to the second user device; and receiving a response to the authentication query from the second user device.

4. The system of claim 3, wherein the authentication query comprises a request to access a user application installed on the second user device.

5. The system of claim 1, wherein the one or more remediation options comprises:

returning control of the first user device to the user; and automatically executing the intended user action based on detecting that the alternative authentication process has succeeded.

6. A computer program product for user device recovery through alternative user authentication processes, the computer program product comprising a non-transitory computer-readable medium comprising code causing an apparatus to perform the steps of:

receiving a request to execute an intended user action using a first user device associated with a user;

detecting a failed user authentication attempt associated with the first user device, wherein the failed user authentication attempt comprises detecting a threshold number of failed authentication attempts and locking the first user device based on detecting the threshold number of failed authentication attempts;

presenting one or more alternative authentication options to the user on a display device;

detecting that an alternative authentication process with a second user device based on the one or more alternative authentication options has succeeded, wherein detecting the alternative authentication process further comprises capturing live authentication data from the user and comparing the live authentication data to reference authentication data associated with the user and first user device, wherein the second user device displays a scannable code with authentication credentials for the first user device; and presenting one or more remediation options to the user on a display device.

7. The computer program product of claim 6, wherein the one or more alternative authentication options comprises initiating the alternative authentication process using a second user device.

8. The computer program product of claim 7, wherein the second user device is a mobile computing device of the user, wherein the alternative authentication process further comprises:

establishing a wireless connection to the second user device;

transmitting an authentication query to the second user device; and receiving a response to the authentication query from the second user device.

9. The computer program product of claim 8, wherein the authentication query comprises a request to access a user application installed on the second user device.

10. A computer-implemented method for user device recovery through alternative user authentication processes, the computer-implemented method comprising:

receiving a request to execute an intended user action using a first user device associated with a user;

detecting a failed user authentication attempt associated with the first user device, wherein the failed user authentication attempt comprises detecting a threshold number of failed authentication attempts and locking the first user device based on detecting the threshold number of failed authentication attempts;

presenting one or more alternative authentication options to the user on a display device;

detecting that an alternative authentication process with a second user device based on the one or more alternative authentication options has succeeded, wherein detecting the alternative authentication process further comprises capturing live authentication data from the user and comparing the live authentication data to reference authentication data associated with the user and first user device, wherein the second user device displays a scannable code with authentication credentials for the first user device; and presenting one or more remediation options to the user on a display device.

11. The computer-implemented method of claim 10, wherein the one or more alternative authentication options comprises initiating the alternative authentication process using a second user device.

12. The computer-implemented method of claim 11, wherein the second user device is a mobile computing device of the user, wherein the alternative authentication process further comprises:

establishing a wireless connection to the second user device;

transmitting an authentication query to the second user device; and receiving a response to the authentication query from the second user device.

13. The computer-implemented method of claim 12, wherein the authentication query comprises a request to access a user application installed on the second user device.

14. The computer-implemented method of claim 10, wherein the one or more remediation options comprises:

returning control of the first user device to the user; and automatically executing the intended user action based on detecting that the alternative authentication process has succeeded.

* * * * *